United States Patent
Jones et al.

(10) Patent No.: US 11,907,565 B2
(45) Date of Patent: Feb. 20, 2024

(54) STORING WRITE DATA IN A STORAGE SYSTEM

(71) Applicant: INTERNATIONAL BUSINESS MACHINES CORPORATION, Armonk, NY (US)

(72) Inventors: Gareth Paul Jones, Hampshire (GB); Ben Sasson, North Baddesley (GB); Lee Jason Sanders, Chichester (GB); Gordon Douglas Hutchison, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 53 days.

(21) Appl. No.: 16/847,717

(22) Filed: Apr. 14, 2020

(65) Prior Publication Data

US 2021/0318830 A1   Oct. 14, 2021

(51) Int. Cl.
*G06F 3/06* (2006.01)

(52) U.S. Cl.
CPC ............ *G06F 3/0653* (2013.01); *G06F 3/067* (2013.01); *G06F 3/0608* (2013.01); *G06F 3/0619* (2013.01); *G06F 3/0631* (2013.01); *G06F 3/0644* (2013.01); *G06F 3/0683* (2013.01)

(58) Field of Classification Search
CPC .... G06F 3/0653; G06F 3/0608; G06F 3/0619; G06F 3/0631; G06F 3/0644; G06F 3/067; G06F 3/0683
See application file for complete search history.

(56) References Cited

U.S. PATENT DOCUMENTS

| 6,000,009 A | * | 12/1999 | Brady | G06F 3/0689 711/112 |
| 6,028,725 A | * | 2/2000 | Blumenau | G11B 20/1252 360/48 |

(Continued)

FOREIGN PATENT DOCUMENTS

| CN | 1271938 A | 11/2000 |
| CN | 104238963 A | 12/2014 |
| CN | 109814809 A | 5/2019 |

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Eric T Loonan
(74) *Attorney, Agent, or Firm* — Rakesh Roy

(57) ABSTRACT

A method, computer system, and a computer program product for storing a write data in a storage system that operates using a log-structured filing system is provided. The present invention may include compressing a write data. The present invention may also include identifying a region of a storage system based on a first size of the compressed write data. The present invention may further include the storage system operating using a log-structured filing system. The present invention may also include a different region of the storage system having a different compression ratio. The present invention may further include writing the compressed write data in the identified region of the storage system.

16 Claims, 7 Drawing Sheets

(56) References Cited

U.S. PATENT DOCUMENTS

| | | | |
|---|---|---|---|
| 7,197,302 B2* | 3/2007 | Date | G06F 9/4411 |
| | | | 455/418 |
| 9,165,016 B2 | 10/2015 | Ganesh | |
| 9,880,743 B1 | 1/2018 | Armangau | |
| 10,223,008 B1 | 3/2019 | Bigman | |
| 2012/0110247 A1* | 5/2012 | Eleftheriou | G06F 12/0888 |
| | | | 711/103 |
| 2012/0210066 A1* | 8/2012 | Joshi | G06F 12/0811 |
| | | | 711/118 |
| 2014/0208004 A1 | 7/2014 | Cohen | |
| 2016/0253105 A1* | 9/2016 | Chang | G06F 3/0608 |
| | | | 711/154 |
| 2018/0267714 A1* | 9/2018 | Nazari | G06F 3/0647 |

OTHER PUBLICATIONS

SlimCache: Exploiting Data Compression Opportunities in Flash-based Key-value Caching, IEEE Computer Society, 2018. pp. 209-222.

* cited by examiner

STORING WRITE DATA IN A STORAGE SYSTEM

BACKGROUND

The present invention relates generally to the field of computing, and more particularly to storing write data in a storage system that operates using a log-structured filing system.

Interest has grown in the use of log-structured file systems, in which a storage arrangement (e.g., a storage system) is arranged as a large log, with new data for storage being sequentially written to the end of the log. Superseded data in a log-structured filing system, e.g., data that has been replaced by newly written data, is marked as invalid or no longer in use, and can be cleaned up (e.g., deleted) in a clean-up or garbage collection process. In a log-structured filing system, there is no fixed mapping between the logical (or "virtual") block address of the data and its physical location in the storage arrangement. Accordingly, metadata is generated for identifying the location of a desired piece of data within the storage arrangement.

SUMMARY

Embodiments of the present invention disclose a method, computer system, and a computer program product for storing a write data in a storage system that operates using a log-structured filing system. The present invention may include compressing a write data. The present invention may also include identifying a region of a storage system based on a first size of the compressed write data. The present invention may further include the storage system operating using a log-structured filing system. The present invention may also include a different region of the storage system having a different compression ratio. The present invention may further include writing the compressed write data in the identified region of the storage system.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
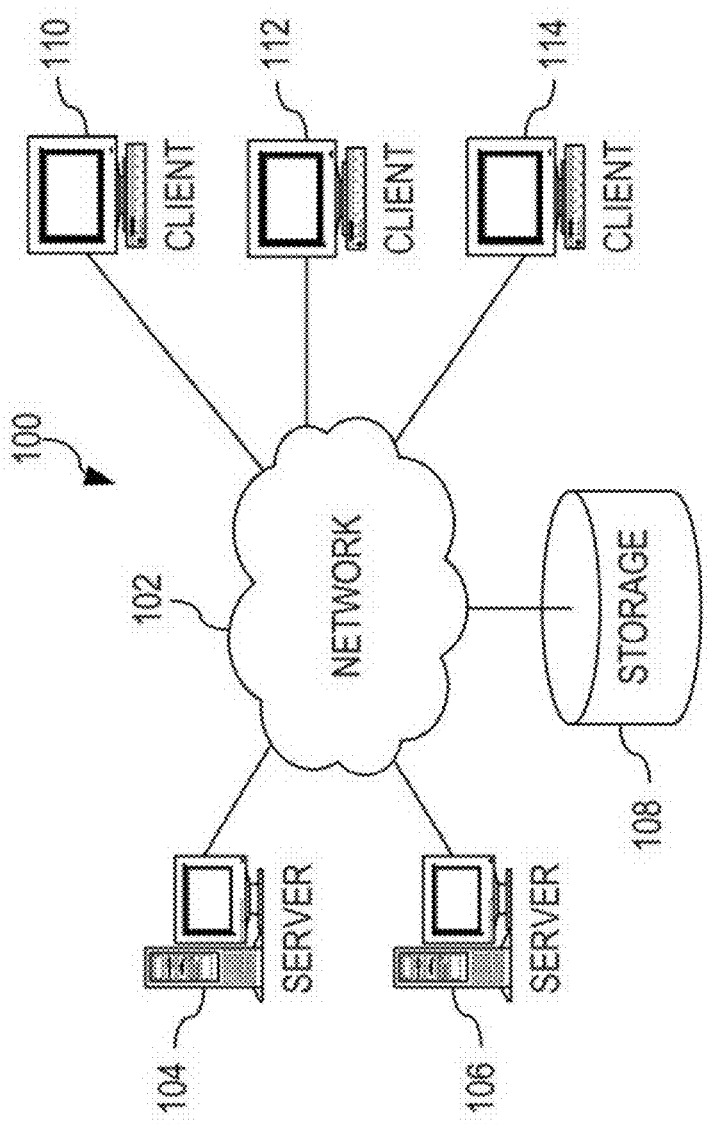
FIG. 1 is a block diagram illustrating an exemplary distributed system according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

In the context of the present application, where embodiments of the present disclosure constitute a method, it should be understood that such a method may be a process for execution by a computer, e.g., may be a computer-implementable method. The various steps of the method may therefore reflect various parts of a computer program, e.g., various parts of one or more algorithms.

Also, in the context of the present application, a system may be a single device or a collection of distributed devices that are adapted to execute one or more embodiments of the methods of the present disclosure. For instance, a system may be a personal computer (PC), a server or a collection of PCs and/or servers connected via a network such as a local area network, the Internet and so on to cooperatively execute at least one embodiment of the methods of the present disclosure.

Embodiments propose a new storage mechanism for storage systems that operate using a log-structured filing system. The proposed embodiments enable a reduction in the amount of wasted space within the storage system, and enable more efficient storage of write data within a storage system. Embodiments consider the implementation difficulties of log-structured filing systems when improving the efficiency of storing data within a storage system.

Effectively, the present disclosure proposes to select a location for storing write data within a storage system based on a size of a compression of the write data. In particular, the present disclosure recognizes that different instances of write data will be compressible by differing amounts (e.g., some write data may be more compressible than others). By selecting a location to store the (compressed) write data based upon a size of the compressed write data, e.g., a compression ratio, then a storage efficiency can be increased by dedicated certain areas of the storage to highly compressible data. For example, different extents of the storage system may be capable of storing differently sized grains.

Embodiments of the disclosure also enable an efficient hybrid log-structured filing system to be provided, by taking account of methods for storing variable compressibility write data within existing data allocations for the write data.

A Redundant Array of Inexpensive/Inexpensive Disks/Drives (RAID) storage system is a drive array that allows storage of data to be distributed across a plurality of different storage units. There are a number of standard storage mechanisms for such drive arrays that are traditionally used to store data, and are commonly referred to as levels. Raid 0 is one known storage mechanism, in which data is striped across different storage units. Raid 1 is another storage mechanism, in which data is mirrored, e.g., copied, across multiple storage units. Raid 5/6 are other storage mechanisms in which data is striped across different storage units, and parity data is generated and stored, to enable stored data to be reconstructed should a drive failure occur. Embodiments of the disclosure are particularly advantageous when used in a RAID storage system, comprising a plurality of storage units.

Embodiments of the disclosure proposes a computer-implemented method for storing write data in a storage system that operates using a log-structured filing system, the computer-implemented method comprising: compressing the write data; identifying a region of the storage system based upon a size of the compressed write data, where different regions of the storage system are designed for compression ratios; and writing the compressed write data in the identified region of the storage system.

The present disclosure proposes to write data to a storage system in different regions dependent upon its compression ratio. In particular, the storage system may be adapted to have different regions designed for different compression ratios, so that the storage location of the write data can be dependent upon the extent to which it is compressed/compressible.

In particular examples, the storage system is divided into extents of a fixed size. Different extents may be designated for storing data of different compressibility, such that extents dedicated to highly compressible data effectively contain space for more grains of data in total (as each grain will be more compressible than other grains).

As described previously, interest has grown in the use of log-structured file systems, in which a storage arrangement (e.g., a storage system) is arranged as a large log, with new data for storage being sequentially written to the end of the log. Superseded data in a log-structured filing system, e.g., data that has been replaced by newly written data, is marked as invalid or no longer in use, and can be cleaned up (e.g., deleted) in a clean-up or garbage collection process. In a log-structured filing system, there is no fixed mapping between the logical (or "virtual") block address of the data and its physical location in the storage arrangement. Accordingly, metadata is generated for identifying the location of a desired piece of data within the storage arrangement.

In particular, location metadata (forward lookup data) may be generated and maintained to enable the physical location of a desired piece of data within the storage arrangement (e.g., its position within the log) to be identified from a logical block address or logical position. Similarly, identifying metadata (reverse lookup data) may also be generated and stored alongside the physical location of a desired piece of data, the identifying metadata providing a mapping between the physical location and a logical/virtual position of the piece of data.

The present disclosure may place (e.g., write) data into region dependent upon its compression ratio, which may minimize wasted space. Embodiments of the present disclosure may also help improve the efficiency of metadata, in particular by avoiding the need to update metadata, and garbage collection.

The step of writing the compressed write data may include writing the compressed write data to a grain of the identified region of the storage system. A grain of data is typically the smallest unit of data for which a storage system provides a unique address (when operating according to a log-structured filing system). Write operations are usually performed on a grain-by-grain basis. A larger piece of data to be written may be divided into a plurality of grains, each of which may be individually written.

The step of identifying a region of the storage system may comprise identifying one of a plurality of extents of the storage system responsive to the size of the compressed write data, where different extents are configured to store grains of different sizes.

As previously explained, different extents of the storage system may be designed for storing different numbers of grains, the number of grains being based upon the size of the compressed grain. Effectively, different extents (of a same size) may store grains of different sizes, so that some extents for storing highly compressible grains can store more (compressed) than extents designed for storing less compressible grains.

Thus, in some embodiments, identifying a region of the storage area may comprise identifying an extent that stores grains of a suitable size. In the context of the present disclosure, a "suitable size" for a grain may be the smallest possible sized grain that is able to store (e.g., fully contain) the compressed write data.

The method may further comprise a step of identifying a location of a first previous version of the write data within the storage system, where the step of identifying the region of the storage system comprises: comparing a size of the compressed write data to the size of the allocated space for the first previous version of the write data within the storage system; and identifying the region of the storage system based on an outcome of the comparison to the first previous version.

Thus, in some embodiments, storage of a piece of compressed write data may be dependent upon a previous version of the write data in the data storage. Embodiments may, for example, incorporate a hybrid storage system, in which a log-structured filing approach is used, but data can be overwritten in place (e.g., to prevent a need to overwrite metadata with a new pointer). Some suitable embodiments for such a hybrid storage system will be understood from the following examples.

The step of identifying the region of the storage system based on an outcome of the comparison may comprise: selecting the allocated space for the first previous version of the write data to act as the identified region of the storage system in response to the size of the compressed write data being within a predetermined range, the bounds of the predetermined range being dependent upon the size of the allocated space for the first previous version of the write data within the storage system; and identifying a different region of the storage system based upon a size of the compressed write data in response to the size of the compressed write data being outside the predetermined range.

Thus, the method may overwrite existing data (a "previous version") in place if the size allocated for the existing data is suitable for the new piece of (compressed) write data. In particular, an allocated space for existing data may be suitable if the new piece of compressed write data is sized to fit within the allocated space.

In some examples, if the compressed write data is much smaller than the existing data, then the compressed write data may be written to a different region of the storage system based upon its size, e.g., to an extent designed for storing smaller grains of data. Thus, the allocated space for the previous version of the write data may define a range with an upper bound (defined by, e.g., equal to, the size of the allocated space) and a lower bound (defined by an acceptable difference between an allocated space and the size of the (compressed) write data).

The step of identifying the region of the storage system may further comprise: in response to the size of the compressed write data being outside of the predetermined range, identifying a location of a second previous version of the write data within the storage system, the second previous version being previous to the first previous version; comparing a size of the compressed write data to the size of the allocated space for the second previous version of the write data within the storage system; and identifying the region of the storage system based on an outcome of the comparison to the second previous version.

Thus, in some embodiments, the compressed write data can be written to a yet older version of the write data. For a log-structured array, this would avoid the need to write backward lookup data for the write data (e.g., data that maps a physical location of the compressed write data to a logical location of the write data). Forward lookup data for the write data (e.g., data that maps a logical location of the write data to a physical location of the write data) would still need to be (over)written in this scenario.

The method may further comprise identifying a location of a first previous version of the write data within the storage system; obtaining garbage collection information indicative of a likelihood that the allocated space for the first previous version of the write data will shortly undergo a garbage collection process; and identifying the region of the storage system further based on the garbage collection information.

In other words, the method may take a likelihood that the previous version will shortly be garbage collected into account when deciding whether to store the compressed write data in a space allocated for a previous version of the write data.

Garbage collection is a well-known process in log-structured arrays, in which extents storing a large amount of old or "dirty" data are made available for the storage of new data. A garbage collecting process comprises rewriting any active data (e.g., data that has not been superseded) stored in extent(s) undergoing garbage collection to a different extent. By basing a decision on whether to store compressed write data in a space allocated for a previous version based on the likelihood that the previous version will shortly be garbage collection, it is possible to avoid or anticipate the rewriting of recently stored data, e.g., by not writing to an allocated space that will shortly be rewritten in any event.

The step of identifying the region of the storage system may comprise not selecting the location of a first previous version of the write data as the region of the storage system in response to the garbage collection information indicating that it is likely that the allocated space will shortly undergo a garbage collection process.

The method may further comprise generating location information for the write data, the location information identifying a physical location of the stored write data within the storage system; and storing the generated location information in the storage system.

In other words, methods may comprise generating forward lookup data that enable a physical location of the compressed write data to be identified. In particular, the forward lookup data (e.g., the location information) may map a logical or virtual location of the compressed write data to a physical location of the write data within the data storage system. This may be required because the physical address of the compressed write data is no longer fixed (due to the use of a log-structured storage system).

Optionally, the location information further identifies a physical location of at least one previous version of the compressed write data in the storage system, where the step of identifying a region of the storage system based upon a size of the compressed write data comprises identifying the region of the storage system further based on a location of at least one previous version of the write data.

In other words, the region to which the compressed data is stored may depend upon the location of a previous version of the write data, which can be obtained from the location information (forward lookup information).

The location information preferably further identifies a size of the written compressed write data, and optionally at least a size of at least one previous version of the written compressed write data.

This embodiment enables an early assessment as to whether a storage space allocated to a previous version of the write data is suitably sized for storing the compressed write data, thereby avoiding a need to check (e.g., through one or more additional read operation) whether said storage space is suitably sized.

The step of identifying a region of the storage system may comprise: identifying a size of at least one previous version of the compressed write data; and identifying a region of the storage system further based on the size of at least one previous version of the compressed write data.

The skilled person will appreciate that embodiments provides a processing system capable of carrying out the above-described method, and would readily contemplate and understand modules that are capable of carrying out the various steps of the described method.

FIG. 1 is a block diagram illustrating an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first server 104 and a second server 106 are connected to the network 102 along with a storage system 108 which may, for example, comprise a RAID storage array formed of a plurality of storage units. However, other storage systems are also contemplated. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present disclosure, and therefore, the particular elements shown in FIG. 1 should not be considered limiting with regard to the environments in which the illustrative embodiments of the present disclosure may be implemented.

The network 102 may be configured to perform one or more methods according to an embodiment of the disclosure, e.g., to control the storage of write data within the storage system 108.

Figure 2:
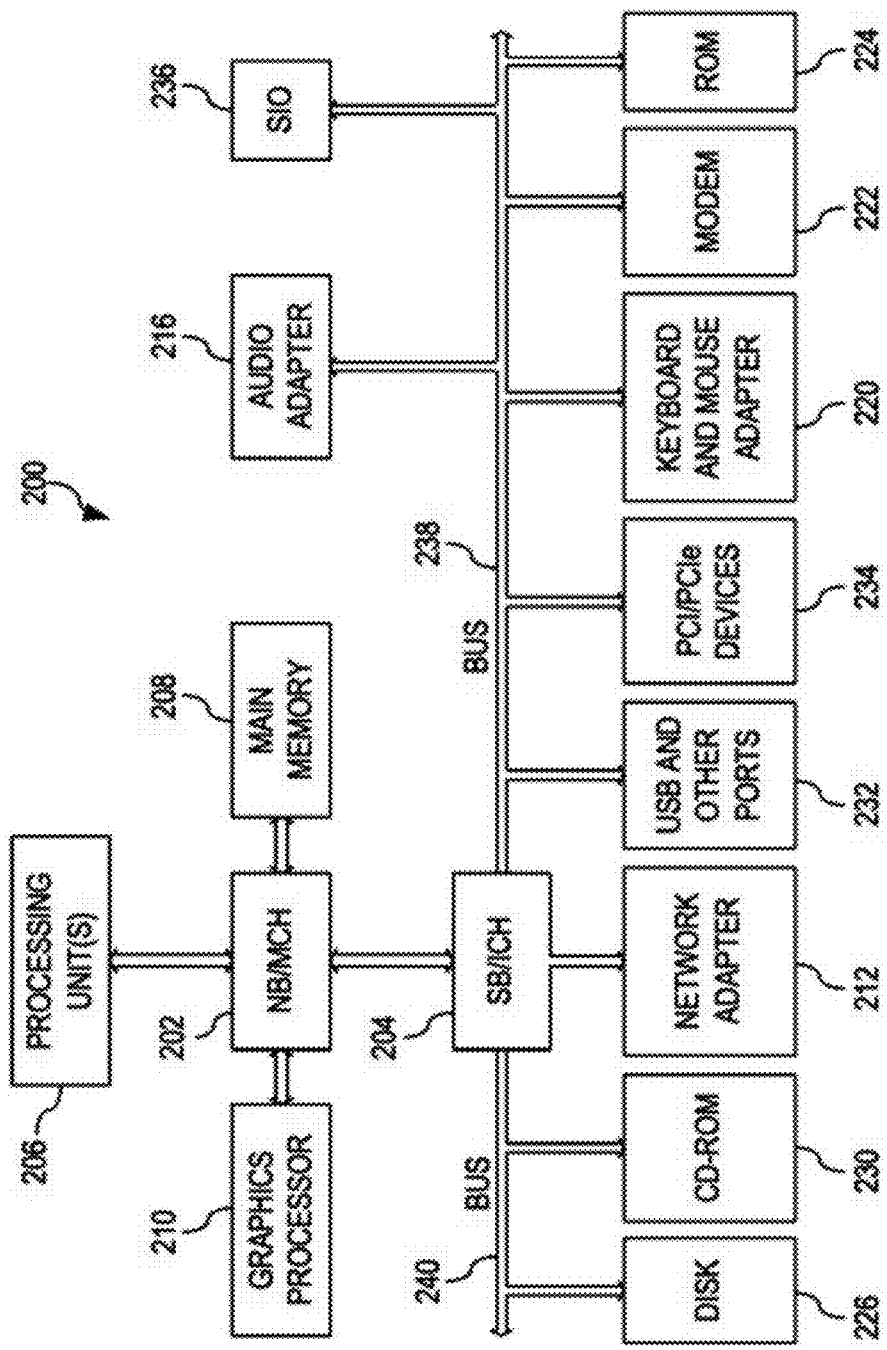
FIG. 2 is a block diagram illustrating an exemplary system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present disclosure may be located. For instance, the system 200 may be configured to implement an identifying unit, an associating unit, and a creating unit according to an embodiment.

In the depicted example, the system 200 employs a hub architecture including a north bridge and memory controller hub (NB/MCH) 202 and a south bridge and input/output (I/O) controller hub (SB/ICH) 204. A processing system 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing system 206. The operating system coordinates and provides control of various components within the system 200 in FIG. 2. As a client, the operating system may be a commercially available operating system. An object-oriented programming system, such as the Java® (Java and all Java-based trademarks and logos are trademarks or registered trademarks of Sun Microsystems, Inc. and/or its affiliates) programming system, may run in conjunction with the operating system and provides calls to the operating system from Java programs or applications executing on system 200.

As a server, system 200 may be, for example, an IBM® eServer™ System p® (IBM eServer System p and all IBM-based trademarks and logos are trademarks or registered trademarks of International Business Machines Corporation and/or its affiliates) computer system, running the Advanced Interactive Executive (AIX®) (AIX and all IBM-based trademarks and logos are trademarks or registered trademarks of International Business Machines Corporation and/or its affiliates) operating system or the LINUX® (LINUX and all LINUX-based trademarks and logos are trademarks or registered trademarks of The Linux Foundation and/or its affiliates) operating system. The system 200 may be a symmetric multiprocessor (SMP) system including a plurality of processors in processing system 206. Alternatively, a single processor system may be employed.

Instructions for the operating system, the programming system, and applications or programs are located on storage devices, such as HDD 226, and may be loaded into main memory 208 for execution by processing system 206. Similarly, one or more message processing programs according to an embodiment may be adapted to be stored by the storage devices and/or the main memory 208.

The processes for illustrative embodiments of the present disclosure may be performed by processing system 206 using computer usable program code, which may be located in a memory such as, for example, main memory 208, ROM 224, or in one or more peripheral devices 226 and 230.

In particular, the processing system 206 may be adapted to perform one or more methods according to embodiments of the disclosure. In particular, the HDD 226 could comprise a storage system, for which the processing system 206 controls the storage of data therein.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present disclosure.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
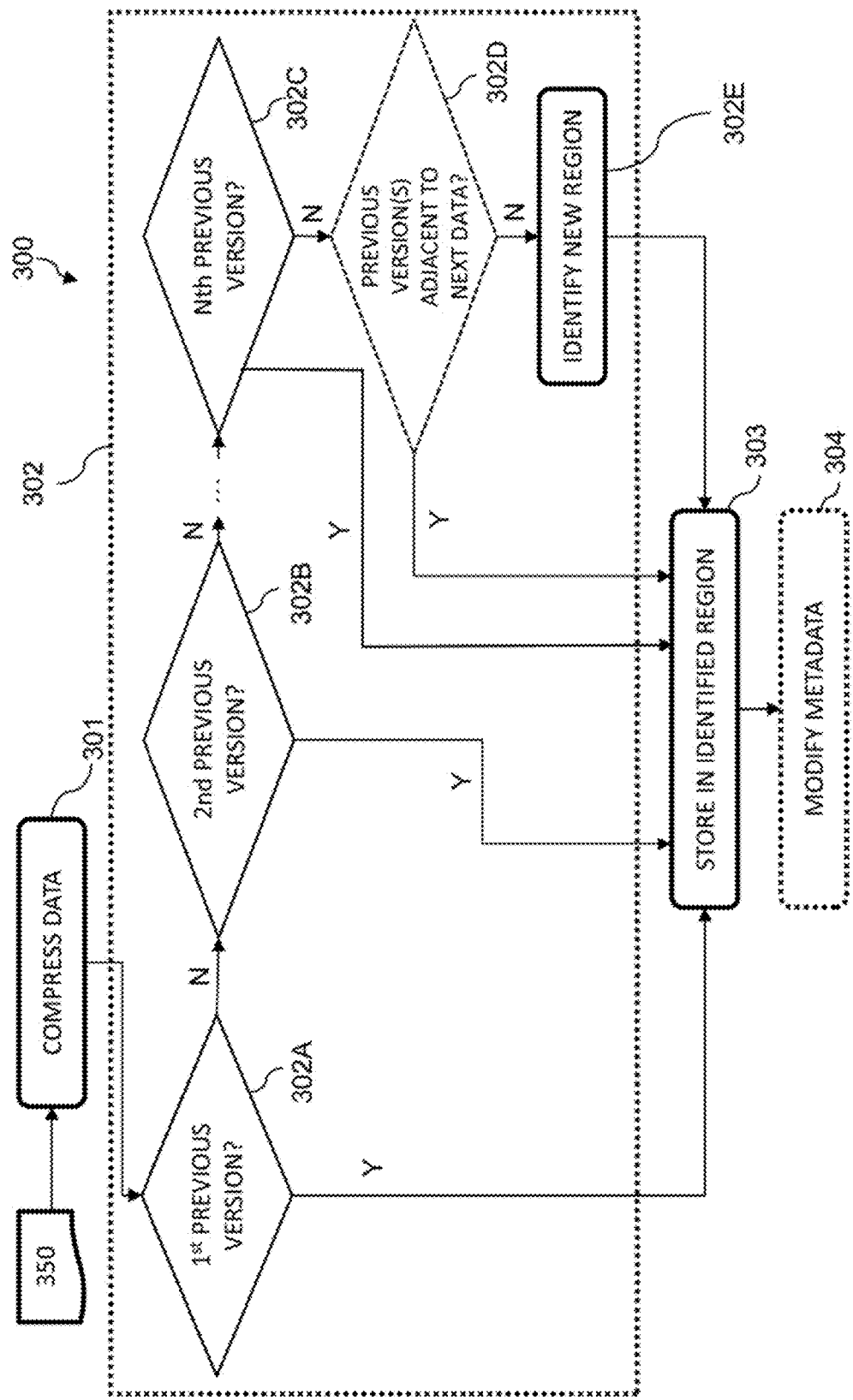
FIG. 3 is a flow diagram illustrating a process for storing write data according to at least one embodiment.

Referring now to FIG. 3, a flow diagram illustrating a computer-implemented method 300 for storing write data 350 in a storage system that operates using a log-structured filing system according to at least one embodiment is depicted.

The method 300 may be performed by any processing system designed for storing data in a log-structured storage system, such as a log-structured RAID drive array. In such a system, a default storage mechanism may write data sequentially, so that new versions of a piece of data may be appended to a log (rather than existing data being updated in-situ).

The storage space of a storage system may be sub-divided into a number of storage sub-spaces. In particular, a storage system may be divided into a number of extents, which may be between 32 MB and 8 GB in size (although other sizes are also contemplated). Garbage collection may occur on an extent-by-extent basis.

A storage space of a storage system may also be divided into a number of grains. One grain is the smallest unit of data that can have a unique address in a log-structured storage system. Typically, an extent may be aligned and sized to store a plurality of grains. The present disclosure proposes to provide extents that may provide differing amounts of space per grain of data.

A storage system may also be dividable into sectors, which are the smallest addressable unit of storage of the storage system (e.g., and not necessarily of the log-structure for the storage system). Typically, a sector has a size of 512 bytes or 4 k.

According to one embodiment, a hybrid log-structured storage system may be provided in which the default mechanism of storing data can be modified, e.g., so that storing a new version of data may comprise overwriting an old/previous version of the data in place. Examples of this concept will be made apparent from the following embodiments.

In a log-structured filing system, location metadata may be generated that maps a logical/virtual location of a piece of data (e.g., a virtual location addressable by an external processing system) to a physical location within the storage system. The location metadata may identify a most recently stored version of the piece of data. This location metadata may be stored by the storage system, e.g., at a top of the storage system. The location metadata may also be known as forward lookup data.

Similarly, at least to provide some measure of redundancy, a stored piece of data may be associated with identifying metadata, or reverse lookup data. The identifying metadata may map a physical location of a stored piece of data to its logical/virtual position (e.g., performs the reverse of the location metadata). The identifying metadata may be stored in a same extent of the storage system as the corresponding stored write data.

By overwriting a previous version of data in place with new write data, methods enable a reduction in the amount of additional metadata that may need to be written to keep the storage system up to date. For example, if a most recent previous version may be overwritten in place, then there is no need to write new location metadata or identifying metadata, as this information may still be accurate. Similarly, if an older previous version may be overwritten in place, then there is no need to write new identifying metadata, as this may still be accurate (although the corresponding location metadata may need to be modified and/or rewritten).

At 301, the method 300 includes compressing the write data. Any suitable method of compressing data may be used or appropriated for use in this process.

The size of (each instance of) the write data may be fixed, e.g., by dividing a string of data to be written into pieces of write data of a fixed size. The method may perform this process in a non-illustrated step.

The method 300 comprises a process 302 of identifying a region of the storage system based upon at least a size of the compressed write data. Different regions of the storage system may be designed for different compression ratios, e.g., different sizes of compressed write data. Embodiments of the process 302 will be later described.

Although not specifically illustrated, in one embodiment, the method 300 may also include determining the size of the compressed write data.

According to one embodiment, knowing the amount of physical storage used by each chunk (e.g., stored write data) in an extent may allow garbage collection to make intelligent decisions about which extents are more efficient to collect, since collecting an extent of incompressible data may require fewer metadata updates than collecting a highly compressible extent with the same reclaimable space. Embodiments thereby enable a more efficient garbage collection process to take place.

At 303, the method 300 includes writing or storing the compressed write data to the identified region of the storage system.

FIG. 2 also illustrates an embodiment for the process 302 of identifying a region of the storage system, although other methods may also be contemplated. In the following embodiments, when reference is made to a "previous version of the (compressed) write data," the "compressed write data" will be understood as being the current version of the write data.

In an embodiment, at 302A, the process 302 includes comparing a size of the compressed write data to a size of the allocated space for a first previous version of the compressed write data. The first previous version may include the most recently stored version of the compressed write data.

The size of the previous version may be obtained by, for example, identifying a location of the previous version within the storage system and actively performing a size check on the previous version (e.g., by performing a read of metadata of the previous version). In an alternative embodiment, location metadata, which identifies a location of the previous version, may also indicate a size of the previous version to avoid a need to actively read the physical location of the previous version. Other embodiments may also be contemplated.

The process 302 is adapted to identify a region of the storage system based on an outcome of the comparison to the first previous version performed at 302A.

In the illustrated example, the process 302 is configured to select the allocated space for the first previous version of the write data to act as the identified region of the storage system in response to the size of the compressed write data being within a predetermined range with respect to the allocated space for the first previous version. The bounds of the predetermined range may be dependent upon the size of the allocated space for the first previous version of the write data within the storage system.

If the allocated space for the first previous version is selected for writing the (new version of the) compressed write data, then there may be no need to write location metadata or forward lookup data for identifying the location of the new version of the compressed write data, as the old location metadata will still be accurate. Thus, an amount of metadata writes may be reduced.

Thus, 302A may include comparing the size of the compressed write data to a range defined by the size of the first previous version of the compressed write data.

For example, the predetermined range may be defined as having no lower bound (e.g., a lower bound of 0) and an upper bound defined by (e.g., equal to) the size of the allocated space for the first previous version. Thus, if the size of the compressed write data is smaller than the size of the allocated space for the first previous version, then the location of the allocated space for the first previous version may be selected as the identified region for storing the compressed write data.

As another example, the predetermined range may be defined as having an upper bound defined by the size of the allocated space, and a lower bound being a predetermined multiple or difference from the size of the allocated space (e.g., 60% of the size of the allocated space). Thus, if the size of the compressed write data is smaller than the size of the allocated space for the first previous version, but not so small as to waste space, then the location of the allocated space for the first previous version may be selected as the identified region for storing the compressed write data.

If the size of the compressed write data falls outside of the range defined by the size of the first previous version of the compressed write data, then the process selects a different region of the storage system (e.g., not the allocated space for the previous version).

In some embodiments, at 302N, the process includes comparing a size of the compressed write data to a size of the allocated space for a second previous version of the compressed write data. The second previous version may be the second most recently stored version of the compressed write data.

The size of the second previous version may be obtained by, for example, identifying a location of the second previous version within the storage system and actively performing a size check on the second previous version (e.g., by performing a read of metadata of the previous version). The location of the second previous version may be stored by the location metadata. In an alternative embodiment, the location metadata may also indicate a size of the second previous version to avoid a need to actively read the physical location of the second previous version. Other embodiments may also be contemplated.

The process performed at 302B may be similar or identical to the process performed at 302A. Thus, the compressed write data may, for example, be written to the storage space previously allocated to the second previous of the write data in response to the allocated space being suitably sized (e.g., by the size of the compressed write data being within a predetermined range calculated with respect to size of the previous allocated storage space) to store the compressed write data.

According to one embodiment, the process may also compare the size of the compressed write data to the size of the allocated space(s) for any previous version of the write data in the storage system. This process is conceptually illustrated at 302C, which refers to the Nth previous version.

In some embodiments, the process 302 of identifying a region of the storage system may consider the size of an allocated space for a previous version of the write data and the size of an allocated space for a previous version of a (immediately) subsequent piece of write data to be written to the storage system.

If the compressed write data does not fit into the previously allocated space, but is part of a larger multi-portion write and the next portion of write data is physically adjacent, and does not use up all of its allocated space, the process may perform an overwrite in place by stealing or appropriating space from the previous version of the next portion for the compressed write data. If two pieces of write data are written simultaneously or physically consecutively, it is likely they were written simultaneously in the past, giving a reasonable change of grains being adjacent in this case.

At 302D, the process 302 may include determining whether the combined size of the allocated space for the previous version of the write data and a physically adjacent space is sufficient to store both the compressed write data and the data (stored or to be stored) in the physically adjacent space. In response to a positive determination, the process 302 may move to storing the compressed write data, and the data (stored or to be stored) in the physically adjacent space, in the allocated space for the previous version of the write data and the physically adjacent space.

Although not specifically illustrated in FIG. 3, according to various embodiments, the process 302 may perform 302D for each previous version of the write data checked (e.g., in 302B, 302C or their equivalents).

Preferably, to avoid any additional data in the forward lookup, any moved data may need to start on a boundary that matches the extent with the smallest allocation per grain. This may ensure that the moved data can still be addressed in the forward lookup.

At 302E, the process 302 may include (e.g., if it is unable to overwrite previous version(s) of write data with the write data), identifying a fresh or new area of the storage system for storing the compressed write data. This storage may use the conventional or default storage mechanism of a log-structured storage system.

According to one embodiment, if no previous version of the compressed write data exists (e.g., new data is being stored), 302A-302D may be skipped in their entirety, and the method may move to step 302E.

According to various embodiments, 302A and 302B may be modified to consider a likelihood that a previous version of the write data may be garbage collected soon. An embodiment will be described with reference to 302A, but it is contemplated that such an embodiment may be adapted to be performed within step 302B or 302C (or any similar procedure for any previous version of the write data).

According to one embodiment, 302A may include a sub-step of obtaining garbage collection information indicative of a likelihood that the allocated space for the first previous version of the write data will shortly undergo a garbage collection process. The decision as to whether to store the compressed write data in the allocated space for the first previous version of the write data may be further dependent upon the likelihood that the previous version will undergo a garbage collection process.

In particular embodiments, the process 302 may comprise not selecting the location of a first previous version of the write data as the region of the storage system in response to the garbage collection information indicating that it is likely that the allocated space will shortly undergo a garbage collection process. Thus, overwriting existing data may be avoided if the place to which the data will be written will shortly undergo a garbage collection process. This avoids the need to write out the data twice into the storage system (as a garbage collection process would need to rewrite any live or active (e.g., not superseded) data in the area that has undergone garbage collection). Effectively, this minimizes the work that garbage collection needs to do by draining the extents (of live/active data) beforehand.

In any previously described embodiments, writing data to the storage system may further comprise writing and/or modifying metadata where/if appropriate, e.g., at 304. In particular, writing a piece of write data to a new location of the storage system (e.g., and not overwriting an immediately previous version of the write data) may result in the location metadata being updated.

In some embodiments, each extent of the storage system may store information about the extent—"extent information". This extent information may, for example, provide information on a size of data, identifying data (e.g., reverse lookup data) and invalidation data at the start of the extent. If an extent contains incompressible data, headers for each chunk of data can be stored in this region too, allowing the actual data to be written aligned.

Thus, embodiments of the disclosure may comprise, after writing the write data to the identified region of the storage system, modifying information stored in the extent corresponding to the allocated space for the previous version of the write data. The precise modification may depend upon where the "new" version of the write data is stored and the implementation details of the information or the extent. For example, if the write data is stored in a different extent to the previous version, then the extent information may be modified to invalidate The extent information may be used, for example, in a cleanup or garbage collection process, e.g., to identify a proportion of invalid data to determine whether to garbage collect the extent.

Embodiments of the disclosure also enable invalidations to be stored as a simple bitmap per extent. In particular, by providing extents that have different or dedicated amounts of allocated space per stored grain of data, it is possible to accurately calculate the space freed up by an invalidation (based on only the extent ID). This provides a more efficient method of storing invalidation data, rather than, for example, storing invalidation data in reverse lookup data (identifying data) or some sort of tree.

Embodiments of the disclosure may therefore include, after writing the compressed write data and if the write data does not overwrite a previous version of the write data, invalidating the previous version of the (compressed) write data by modifying/generating invalidation data stored in the extent corresponding to the previous version of the (compressed) write data, wherein the invalidation data comprises a bitmap or bit array.

Embodiments of the disclosure may accurately calculate the space freed up by an invalidation, based only on the extent ID. This may allow invalidations to be stored as a simple bitmap per extent, which is more efficient than embedding them in reverse lookup, or using some sort of tree.

Proposed embodiments are particularly advantageous when the storage system comprises a RAID drive array.

In such embodiments, some further considerations or adaptations of the method may be used to take account of the storage mechanisms of a RAID drive array. In such a RAID drive array, overwriting old data in place may require a re-computation of any parity/check data, depending upon the RAID level used. The storage mechanism may be adapted to take account of the RAID level where appropriate.

By way of example, if the grain to which compressed write data is to be written does not fit evenly into the sector size of the underlying storage system (e.g., the grain is not a multiple of a sector size), it is permissible to overwrite a previous version of the compressed write data in place without additional penalty if the array is RAID level 5 or RAID level 6, since it would be necessary to read the old data anyway to compute the parity update.

However, for RAID levels where it is not necessary have to read old data to compute a parity update, we may want to ensure all extents of the storage system use a compressed grain size that is a multiple of the sector size to avoid a read-modify-write penalty.

Figure 4:
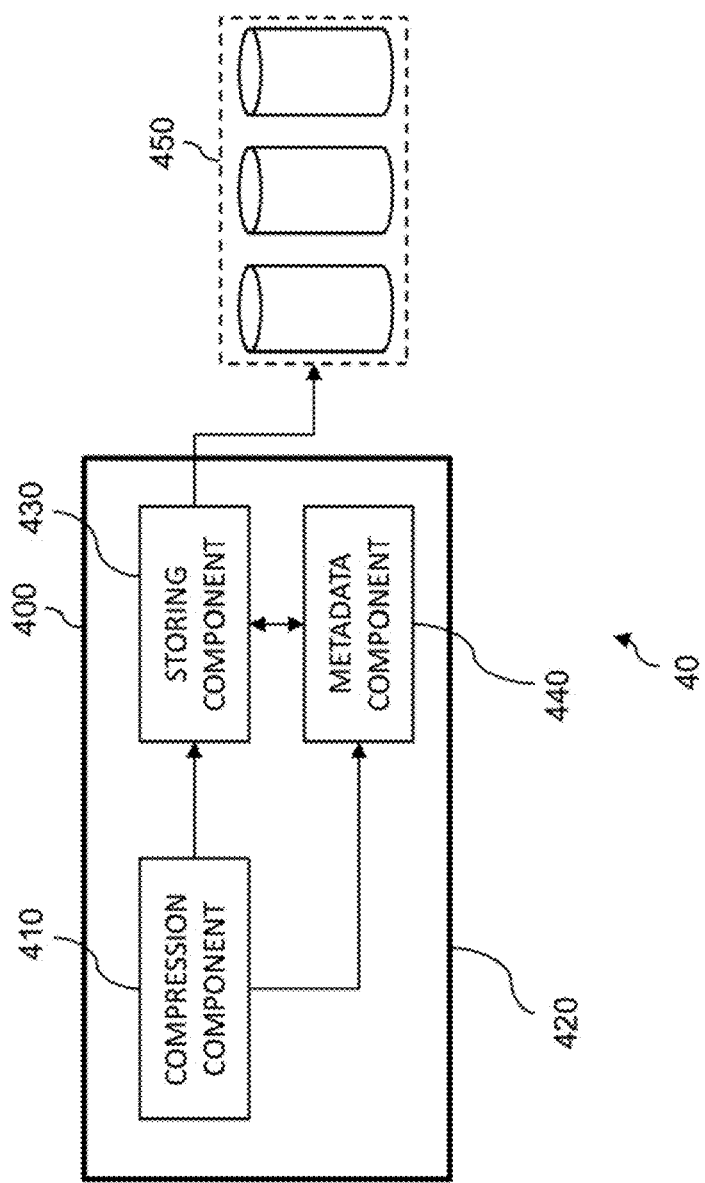
FIG. 4 is a block diagram illustrating a processing system for storing write data according to at least one embodiment.

Referring now to FIG. 4, a block diagram illustrating a processing system 400 for storing write data in a storage system 450 that operates using a log-structured filing system according to at least one embodiment is depicted. The processing system may comprise part of an overall computer system 40 further comprising the storage system 450, where the computer system 40 is also an embodiment of the disclosure.

The processing system 400 may include a compression component 410 adapted to compress the write data.

The processing system 400 may also include a storing component 430 to identify a region of the storage system based upon a size of the compressed write data, where different regions of the storage system may be designed for compression ratios. The storing component 430 may also write the compressed write data in an extent of the identified region of the storage system.

According to various embodiments, any of the components of the described processing system 400 may be modified to enable the processing system 400 to perform any methods described herein. This may include adapting any of the components of the processing system 400 to perform the described method, or providing additional components to carry out described embodiments of the method.

By way of example only, the processing system 400 may include a metadata component 440 configured to generate, modify, or otherwise control metadata stored in the storage system 450.

Figure 5:
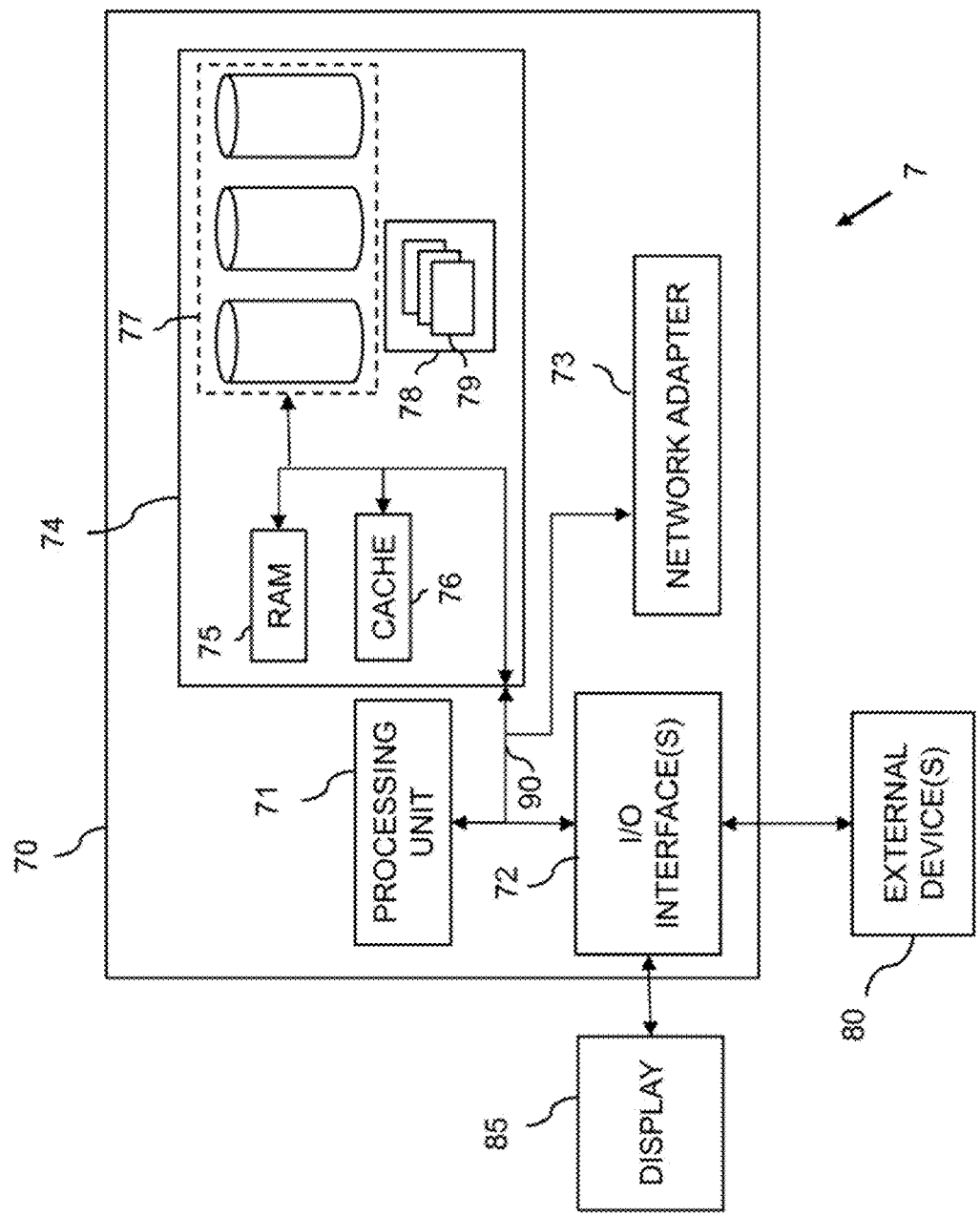
FIG. 5 is a block diagram of internal and external components of computers and servers depicted in FIG. 1 according to at least one embodiment.

Referring now to FIG. 5, a block diagram illustrating a networked system 7 including a computer system 70 according to at least one embodiment is depicted.

According to one embodiment, a processing system may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

The system memory 74 may comprise a storage system 77, such as a RAID drive array formed from at least three storage units. Other suitable storage systems are also contemplated.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform a method storing write data in a storage system that operates using a log-structured filing system.

Program/utility 78, having a set (at least one) of program modules 79, may be stored in memory 74. Program modules 79 generally carry out the functions and/or methodologies of proposed embodiments for storing write data in a storage system that operates using a log-structured filing system.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g., to communicate recreated content to a system or user).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
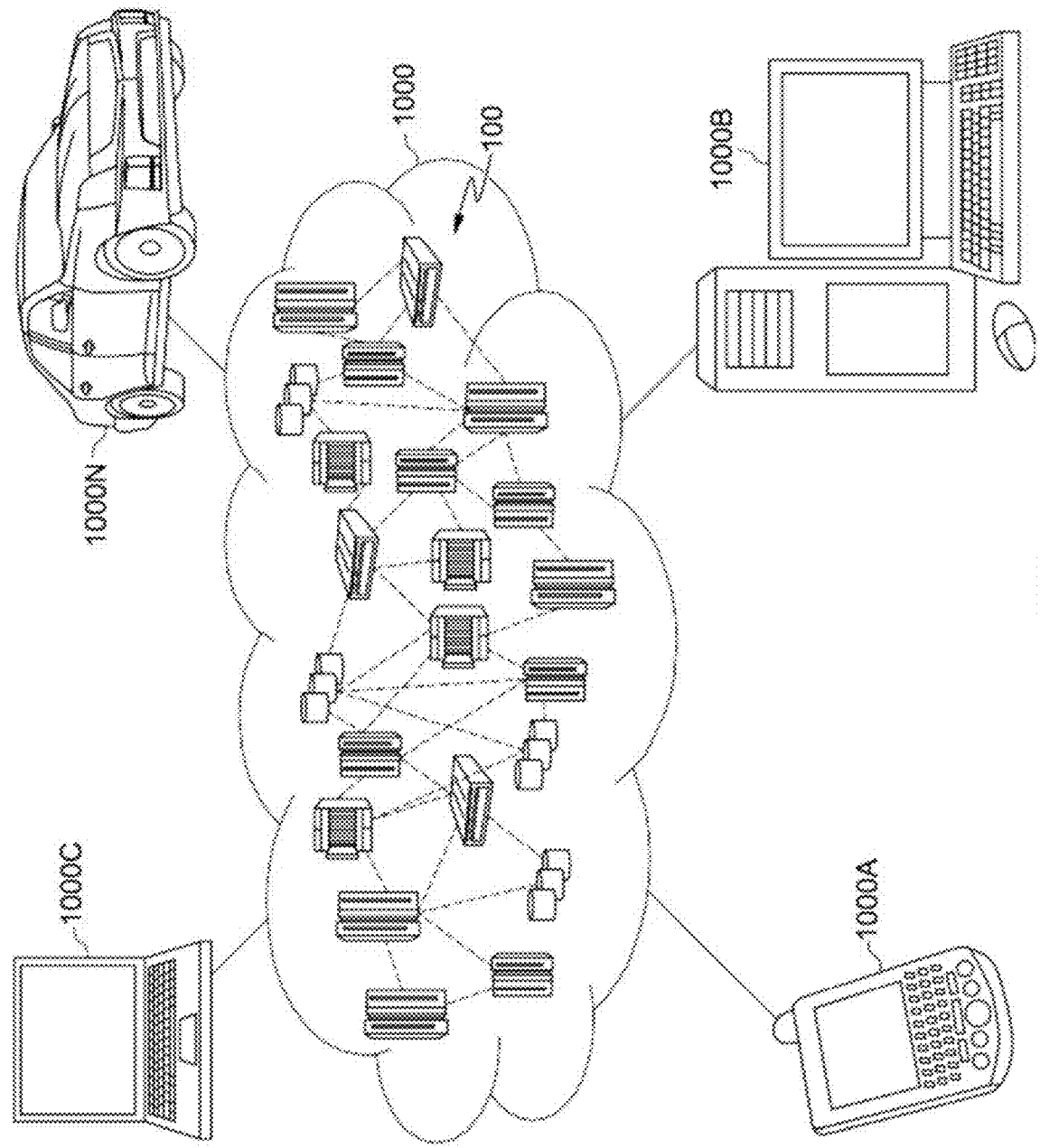
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
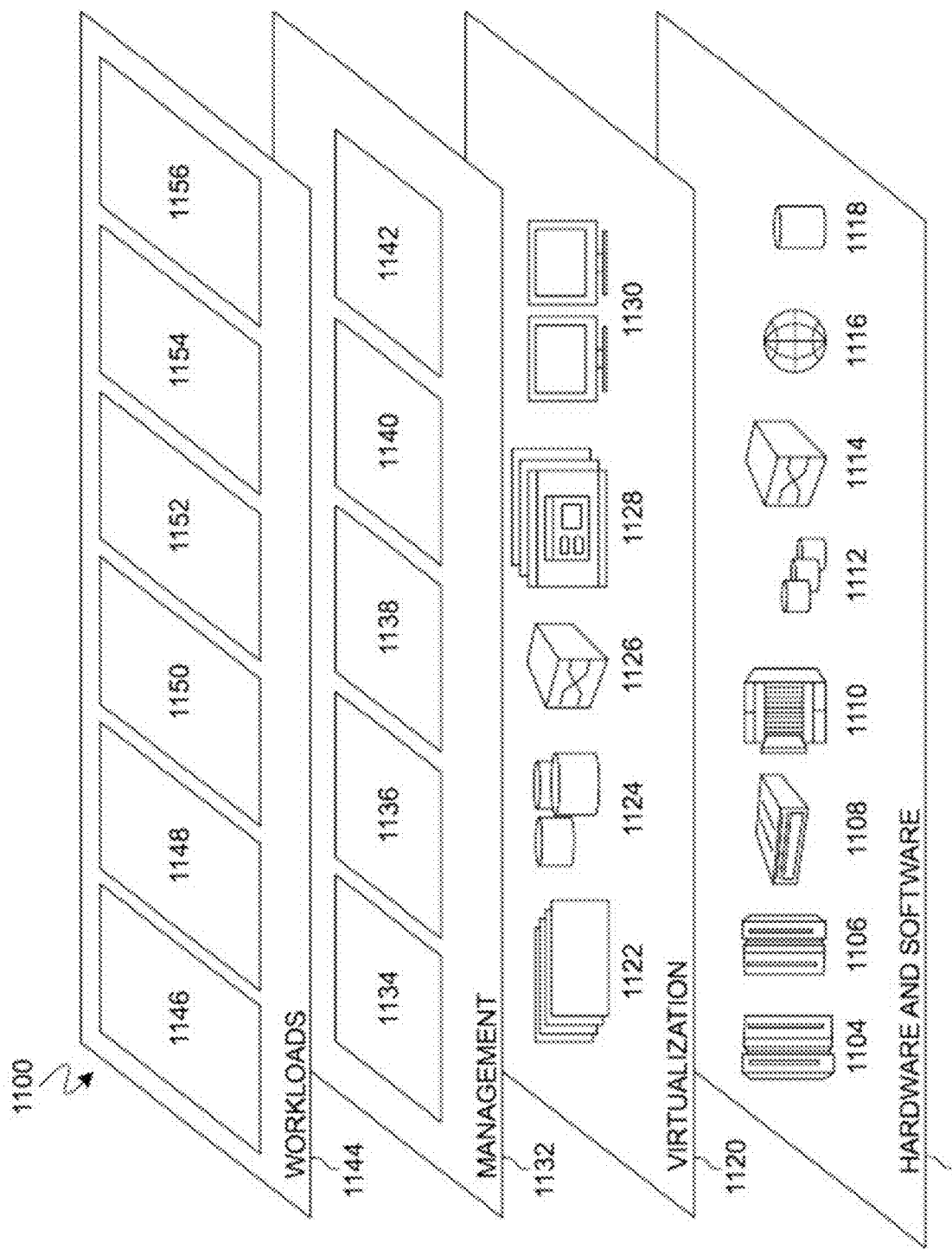
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and storage processing 1156.

In the context of the present application, where embodiments of the present invention constitute a method, it should be understood that such a method is a process for execution by a computer, e.g., is a computer-implementable method. The various steps of the method therefore reflect various parts of a computer program, e.g., various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   compressing a write data to generate a current compressed write data;
   identifying, based on location metadata, a first compressed write data within a log-structured storage system, wherein the first compressed write data includes a previous version of the current compressed write data;
   comparing a size of the current compressed write data to a size of a first allocated space in the log-structured storage system for storing the first compressed write data, wherein the comparing determines whether the size of the first allocated space for storing the first compressed write data is suitably sized to store the current compressed write data;
   determining, based on the comparing, that the size of the first allocated space for storing the first compressed write data is not suitably sized to store the current compressed write data;
   in response to determining that the size of the first allocated space for storing the first compressed write data is not suitably sized to store the current compressed write data, identifying, based on the location metadata, a second compressed write data within the log-structured storage system, wherein the second compressed write data includes a previous version of the first compressed write data;
   comparing the size of the current compressed write data to a size of a second allocated space in the log-structured storage system for storing the second compressed write data, wherein the comparing determines whether the size of the second allocated space for storing the second compressed write data is suitably sized to store the current compressed write data;
   identifying a region of the log-structured storage system for storing the current compressed write data based on an outcome of comparing the size of the current compressed write data and the size of the second allocated space for storing the second compressed write data; and
   writing the current compressed write data in the identified region of the log-structured storage system, wherein different regions of the log-structured storage system are designated for storing grains of data of different compressibility.

2. The method of claim 1, wherein identifying the region of the log-structured storage system further comprises identifying one extent of a plurality of extents of the log-structured storage system responsive to the size of the current compressed write data, wherein a different extent is configured to store grains of a different size.

3. The method of claim 1, wherein comparing the size of the current compressed write data to the size of the first allocated space for storing the first compressed write data further comprises:
   determining whether the size of the current compressed write data is within a first predetermined range associated with the size of the first allocated space for storing the previous version of the current compressed write data in the log-structured storage system.

4. The method of claim 3, wherein comparing the size of the current compressed write data to the size of the second allocated space for storing the second compressed write data further comprises:

determining whether the size of the current compressed write data is within a second predetermined range associated with the size of the second allocated space for storing the previous version of the first compressed write data in the log-structured storage system; and identifying a different region of the log-structured storage system in response to the size of the current compressed write data being outside of the first predetermined range and the second predetermined range.

5. The method of claim 1, wherein identifying the region of the log-structured storage system further comprises:

obtaining a garbage collection information indicative of a likelihood that the second allocated space for the second compressed write data will undergo a garbage collection process; and in response to the garbage collection information indicating that the second allocated space will not likely undergo the garbage collection process, writing the current compressed write data in the identified region associated with the second compressed write data.

6. The method of claim 5, wherein identifying the region of the log-structured storage system further comprises:

in response to the garbage collection information indicating that the second allocated space will likely undergo the garbage collection process, not selecting the second compressed write data as the identified region for writing the current compressed write data.

7. The method of claim 1, further comprising:

generating the location metadata for a stored write data, the location metadata identifying a first physical location of the stored write data within the log-structured storage system; and storing the generated location metadata in the log-structured storage system.

8. The method of claim 7, wherein the generated location metadata further includes a second physical location of at least one previous version of the current compressed write data in the log-structured storage system, and wherein identifying the region of the log-structured storage system based on the size of the current compressed write data includes identifying the region of the log-structured storage system based on a third physical location of the at least one previous version of the current compressed write data.

9. The method of claim 7, wherein the location metadata further includes a current compressed write data size and at least one previous version of the current compressed write data size.

10. The method of claim 1, wherein identifying the region of the log-structured storage system further comprises:

identifying at least one previous version size of the current compressed write data; and identifying the region of the log-structured storage system based on the at least one previous version size of the current compressed write data.

11. A computer program product for storing a write data in a log-structured storage system, the computer program product comprising:

one or more computer readable storage medium and program instructions collectively stored on the one or more computer readable storage medium, the program instructions comprising:

program instructions to compress a write data to generate a current compressed write data;

program instructions to identify, based on location metadata, a first compressed write data within a log-structured storage system, wherein the first compressed write data includes a previous version of the current compressed write data;

program instructions to compare a size of the current compressed write data to a size of a first allocated space in the log-structured storage system for storing the first compressed write data, wherein the comparing determines whether the size of the first allocated space for storing the first compressed write data is suitably sized to store the current compressed write data;

program instructions to determine, based on the comparing, that the size of the first allocated space for storing the first compressed write data is not suitably sized to store the current compressed write data;

program instructions to, in response to determining that the size of the first allocated space for storing the first compressed write data is not suitably sized to store the current compressed write data, identify, based on the location metadata, a second compressed write data within the log-structured storage system, wherein the second compressed write data includes a previous version of the first compressed write data;

program instructions to compare the size of the current compressed write data to a size of a second allocated space in the log-structured storage system for storing the second compressed write data, wherein the comparing determines whether the size of the second allocated space for storing the second compressed write data is suitably sized to store the current compressed write data;

program instructions to identify a region of the log-structured storage system for storing the current compressed write data based on an outcome of comparing the size of the current compressed write data and the size of the second allocated space for storing the second compressed write data; and program instructions to write the current compressed write data in the identified region of the log-structured storage system, wherein different regions of the log-structured storage system are designated for storing grains of data of different compressibility.

12. A computer system for storing a write data in a log-structured storage system, comprising:

one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

compressing a write data to generate a current compressed write data;

identifying, based on location metadata, a first compressed write data within a log-structured storage system, wherein the first compressed write data includes a previous version of the current compressed write data;

comparing a size of the current compressed write data to a size of a first allocated space in the log-structured storage system for storing the first compressed write data, wherein the comparing determines whether the size of the first allocated space for storing the first compressed write data is suitably sized to store the current compressed write data;

determining, based on the comparing, that the size of the first allocated space for storing the first compressed write data is not suitably sized to store the current compressed write data;

in response to determining that the size of the first allocated space for storing the first compressed write data is not suitably sized to store the current compressed write data, identifying, based on the location metadata, a second compressed write data within the log-structured storage system, wherein the second compressed write data includes a previous version of the first compressed write data;

comparing the size of the current compressed write data to a size of a second allocated space in the log-structured storage system for storing the second compressed write data, wherein the comparing determines whether the size of the second allocated space for storing the second compressed write data is suitably sized to store the current compressed write data;

identifying a region of the log-structured storage system for storing the current compressed write data based on an outcome of comparing the size of the current compressed write data and the size of the second allocated space for storing the second compressed write data; and writing the current compressed write data in the identified region of the log-structured storage system, wherein different regions of the log-structured storage system are designated for storing grains of data of different compressibility.

13. The system of claim 12, wherein identifying the region of the log-structured storage system further comprises:

identifying, using a storing component, one extent of a plurality of extents of the log-structured storage system responsive to the size of the current compressed write data, wherein a different extent is configured to store grains of a different size.

14. The system of claim 13, wherein comparing the size of the current compressed write data to the size of the first allocated space for storing the first compressed write data further comprises:

determining whether the size of the current compressed write data is within a first predetermined range associated with the size of the first allocated space for storing the previous version of the current compressed write data in the log-structured storage system.

15. The system of claim 14, wherein comparing the size of the current compressed write data to the size of the second allocated space for storing the second compressed write data further comprises:

determining whether the size of the current compressed write data is within a second predetermined range associated with the size of the second allocated space for storing the previous version of the first compressed write data in the log-structured storage system; and identifying a different region of the log-structured storage system in response to the size of the current compressed write data being outside of the first predetermined range and the second predetermined range.

16. The system of claim 12, wherein identifying the region of the log-structured storage system further comprises:

obtaining a garbage collection information indicative of a likelihood that the second allocated space for the second compressed write data will undergo a garbage collection process; and in response to the garbage collection information indicating that the second allocated space will not likely undergo the garbage collection process, writing the current compressed write data in the identified region associated with the second compressed write data.

* * * * *